United States Patent
Takahashi et al.

(10) Patent No.: US 12,466,526 B2
(45) Date of Patent: Nov. 11, 2025

(54) SHIP CONTROL DEVICE AND SHIP CONTROL METHOD

(71) Applicant: FURUNO ELECTRIC CO., LTD., Hyogo (JP)

(72) Inventors: Tomoyasu Takahashi, Amagasaki (JP); Naoya Hashimoto, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 242 days.

(21) Appl. No.: 18/365,909

(22) Filed: Aug. 4, 2023

(65) Prior Publication Data

US 2023/0373600 A1    Nov. 23, 2023

Related U.S. Application Data

(63) Continuation-in-part of application No. PCT/JP2022/000457, filed on Jan. 11, 2022.

(30) Foreign Application Priority Data

Feb. 15, 2021 (JP) .................................. 2021-021452

(51) Int. Cl.
G05D 1/00 (2024.01)
B63B 79/40 (2020.01)
B63H 25/04 (2006.01)

(52) U.S. Cl.
CPC .............. B63B 79/40 (2020.01); B63H 25/04 (2013.01); G05D 1/0206 (2013.01)

(58) Field of Classification Search
CPC ......... B63B 79/40; B63B 79/10; B63B 79/20; B63B 49/00; B63H 25/04; G05D 1/0206; G05D 2109/34; G05D 1/43; G08G 3/00
See application file for complete search history.

(56) References Cited

U.S. PATENT DOCUMENTS

| | | |
|---|---|---|
| 4,074,648 A | 2/1978 | Reid et al. |
| 4,692,868 A | 9/1987 | Wesner et al. |
| 8,265,812 B2 * | 9/2012 | Pease .................... B63H 25/04 701/4 |

(Continued)

FOREIGN PATENT DOCUMENTS

| | | |
|---|---|---|
| JP | S55-164594 A | 12/1980 |
| JP | 5528251 B2 | 6/2014 |

OTHER PUBLICATIONS

International Search Report issued in PCT/JP2022/000457; mailed Apr. 5, 2022.

(Continued)

*Primary Examiner* — Masud Ahmed
(74) *Attorney, Agent, or Firm* — Studebaker Brackett PLLC

(57) ABSTRACT

Proper setting of feedback control according to the ship.

The ship control device includes processing circuitry configured to set the ship characteristic parameters of the combined system of first order lag and dead time, which integrates the behavior of the rudder and the behavior of the ship. Using the ship characteristic parameters, the processing circuitry is further configured to calculate the control parameters of feedback control with respect to the rudder angle of the rudder. Using the control parameters, the processing circuitry is further configured to perform feedback control.

15 Claims, 15 Drawing Sheets

(56) References Cited

U.S. PATENT DOCUMENTS

| | | | | |
|---|---|---|---|---|
| 8,589,027 | B2* | 11/2013 | Hosokawa | B63H 25/04 180/443 |
| 11,530,022 | B1* | 12/2022 | Andrasko | B63H 25/42 |
| 2007/0162207 | A1* | 7/2007 | Shimo | B63H 25/04 701/42 |
| 2009/0241823 | A1* | 10/2009 | Borrett | B63H 25/02 114/151 |
| 2012/0143408 | A1* | 6/2012 | Hosokawa | B63H 25/04 701/21 |

OTHER PUBLICATIONS

Yashiro, Tatsuya; "About the latest automatic steering device BNAAC"; Journal of Fishing Boat and System Engineering Association of Japan; May 10, 2011; No. 97; ISSN 1346-9800; pp. 46-59; with partial English translation.

Otsu, Kohei et al.; "Evaluation and prospects of Autopilot"; Proceedings of the 3rd symposium on Ship Manoeuvrability; The Society of Naval Architects of Japan; 1981; pp. 243-278; with partial English translation.

Hane, Fuyuki; "A Comprehensive Identification Method for Vessel Motion Parameters"; Journal of the Japan Society of Naval Architects and Ocean Engineers; Dec. 2014; No. 20; ISSN 1881-1760; pp. 27-38.

Sakuma, Shun et al.; "On the Numerical Method for Analyzing the Steering Quality Indices with the Drift Angle Considered"; Journal of the Japan Society of Naval Architects and Ocean Engineers; Jun. 2017; No. 25; ISSN 1881-1760; pp. 1-7.

The extended European search report issued by the European Patent Office on Dec. 12, 2024, which corresponds to European Application No. 22752490.7-1009 and is related to U.S. Appl. No. 18/365,909.

B&G, "B&G, H5000 Operation Manual", Dec. 12, 2014, pp. 1-124, https://softwaredownloads.navico.com/Lowrance/FTP/Lowrance_Software%20-%20Copy/BG_Documents/H5000_OM_EN_988-10630-003_w.pdf, XP093230909.

* cited by examiner

SHIP CONTROL DEVICE AND SHIP CONTROL METHOD

CROSS-REFERENCE TO RELATED APPLICATION(S)

This application is a continuation-in-part application of PCT International Application No. PCT/JP2022/000457, which was filed on Jan. 11, 2022, and which claims priority to Japanese Patent Application No. JP2021-021452 filed on Feb. 15, 2021, the entire disclosures of each of which are herein incorporated by reference for all purposes.

TECHNICAL FIELD

Background

The present disclosure relates to the technology of a ship's autopilot (automatic navigation control).

If the feedback control is not set properly, the desired control of the autopilot cannot be realized.

Therefore, the purpose of the present disclosure is to provide a technique for properly setting the feedback control according to the body of ship.

SUMMARY

The ship control device includes a ship characteristic parameter setting unit, a control parameter calculation unit, and an autopilot execution unit. The ship characteristic parameter setting unit sets the ship characteristic parameters of the combined system of first order lag and dead time that integrates the behavior of the rudder and the behavior of the ship. The control parameter calculation unit calculates the control parameters of feedback control to the rudder angle of the rudder using the ship characteristic parameters. The autopilot execution unit performs feedback control using the control parameters.

In an embodiment of the present disclosure, there is provided a ship control device comprising processing circuitry configured to set ship characteristic parameters of a combined system of first-order lag and dead time, which integrates a behavior of a rudder and a behavior of a ship, calculate control parameters for feedback control with respect to a rudder angle of the rudder using the ship characteristic parameters, and perform the feedback control using the control parameters.

Additionally, or optionally, the processing circuitry is further configured to calculate a desired turnrate of a command rudder angle with respect to the rudder angle using the ship characteristic parameters and perform the feedback control using the desired turnrate.

Additionally, or optionally, the processing circuitry is further configured to calculate the desired turnrate using the ship characteristic parameters and a target heading.

Additionally, or optionally, the processing circuitry is further configured to calculate the control parameters using an evaluation function including the rudder angle, a turnrate, and a heading as evaluation criteria.

Additionally, or optionally, the processing circuitry is further configured to calculate the control parameters by including a squared error between an amount of overshoot of the heading with respect to the target heading and the target heading in the evaluation criteria.

Additionally, or optionally, the processing circuitry is further configured to calculate the control parameters by including a squared error between the desired turnrate and the turnrate in the evaluation criteria.

Additionally, or optionally, the processing circuitry is further configured to calculate the control parameters by including a squared value of the rudder angle in the evaluation criteria.

Additionally, or optionally, the processing circuitry is further configured to calculate steering quality indices using a heading, calculate a rudder rate using the rudder angle, and calculate the ship characteristic parameters using the steering quality indices and the rudder rate.

Additionally, or optionally, the processing circuitry is further configured to calculate the ship characteristic parameters using a time-varying characteristic of the turnrate calculated from the rudder rate and the steering quality indices.

Additionally, or optionally, the processing circuitry is further configured to calculate the ship characteristic parameters using two timings having different predetermined values for the turnrate in the time-varying characteristic.

Additionally, or optionally, the processing circuitry is further configured to calculate dead time or a time constant of steering in the ship characteristic parameters using the time-varying characteristic.

Additionally, or optionally, the processing circuitry is further configured to calculate steering quality indices using a length of ship between perpendiculars relative to the ship, a ship breadth of the ship, and a ship speed of the ship, calculate a rudder rate using the rudder angle, and calculate the ship characteristic parameters using the steering quality indices and the rudder rate.

Additionally, or optionally, the processing circuitry is further configured to calculate a turning ability index in the steering quality indices using the length of ship between perpendiculars and the ship breadth. and calculate a time constant of steering quality in the steering quality indices using the turning ability index, the length of ship between perpendiculars, and the ship speed.

Additionally, or optionally, the processing circuitry is further configured to non-dimensionalize the turning ability index, calculate a non-dimensionalizing time constant of steering quality from the non-dimensionalized turning ability index, and dimensionalize the non-dimensionalizing time constant of steering quality.

In this configuration, ship characteristic parameters are set according to the ship, and the corresponding control parameters are calculated.

According to the disclosure, the setting of feedback control can be properly performed according to the ship.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein:

FIG. 1 is a functional block diagram showing a configuration of an autopilot processor unit of a ship control device according to an embodiment of the present disclosure;

FIG. 2 is a functional block diagram showing a configuration of a ship control system including the ship control device of FIG. 1 according to an embodiment of the present disclosure;

FIG. 3A is a diagram showing target and bow directions, and FIG. 3B is a diagram showing a rudder angle;

FIG. 4 is a flow chart showing a schematic processing from autotuning to autopilot control;

FIG. 5 is a functional block diagram showing a configuration of a first mode of a ship characteristic parameter setting unit;

FIG. 6 is a system configuration diagram of the first mode of the ship characteristic parameter setting unit;

FIG. 7 is a functional block diagram showing the configuration of the characteristic parameter estimation unit;

FIG. 8 is a waveform diagram showing an example of a response waveform of a turnrate for setting the ship characteristic parameters;

FIG. 9A is a flow chart showing the schematic processing of the first calculation mode of the steering quality indices, and FIG. 9B is a flow chart showing the schematic processing of the calculation of the ship characteristic parameters;

FIG. 10 is a functional block diagram showing a configuration of a second mode of the ship characteristic parameter setting unit;

FIG. 11 is a system configuration diagram of the second mode of the ship characteristic parameter setting unit;

FIG. 12 is a flow chart showing the schematic processing of the second mode of calculation of the steering quality indices unit;

FIG. 13 is a graph showing an example of the time variation of the heading;

FIG. 14A is a graph showing the time variation of the heading $\theta_H$ and the target heading $\theta_{set}$, FIG. 14B is a graph showing the time variation of the desired turnrate $r_{set}$ and the turnrate rt, and FIG. 14C is a graph showing the time variation of the rudder angle ra; and FIG. 15: FIG. 15 is a flow chart showing the schematic processing of the calculation of the control parameters.

DETAILED DESCRIPTION OF THE EMBODIMENTS

Figure 1:
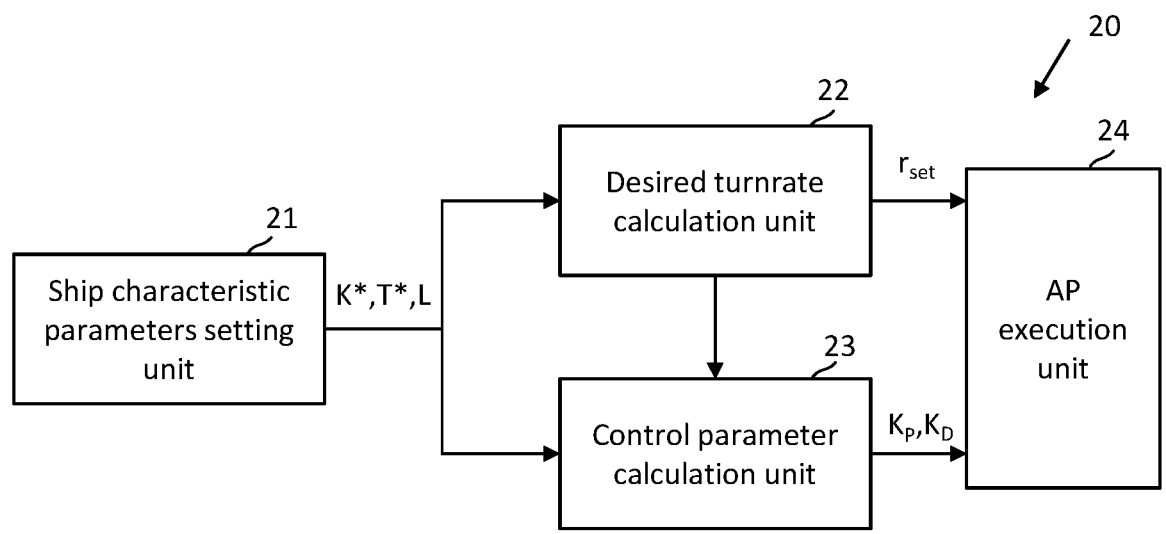
FIG. 1.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 2:
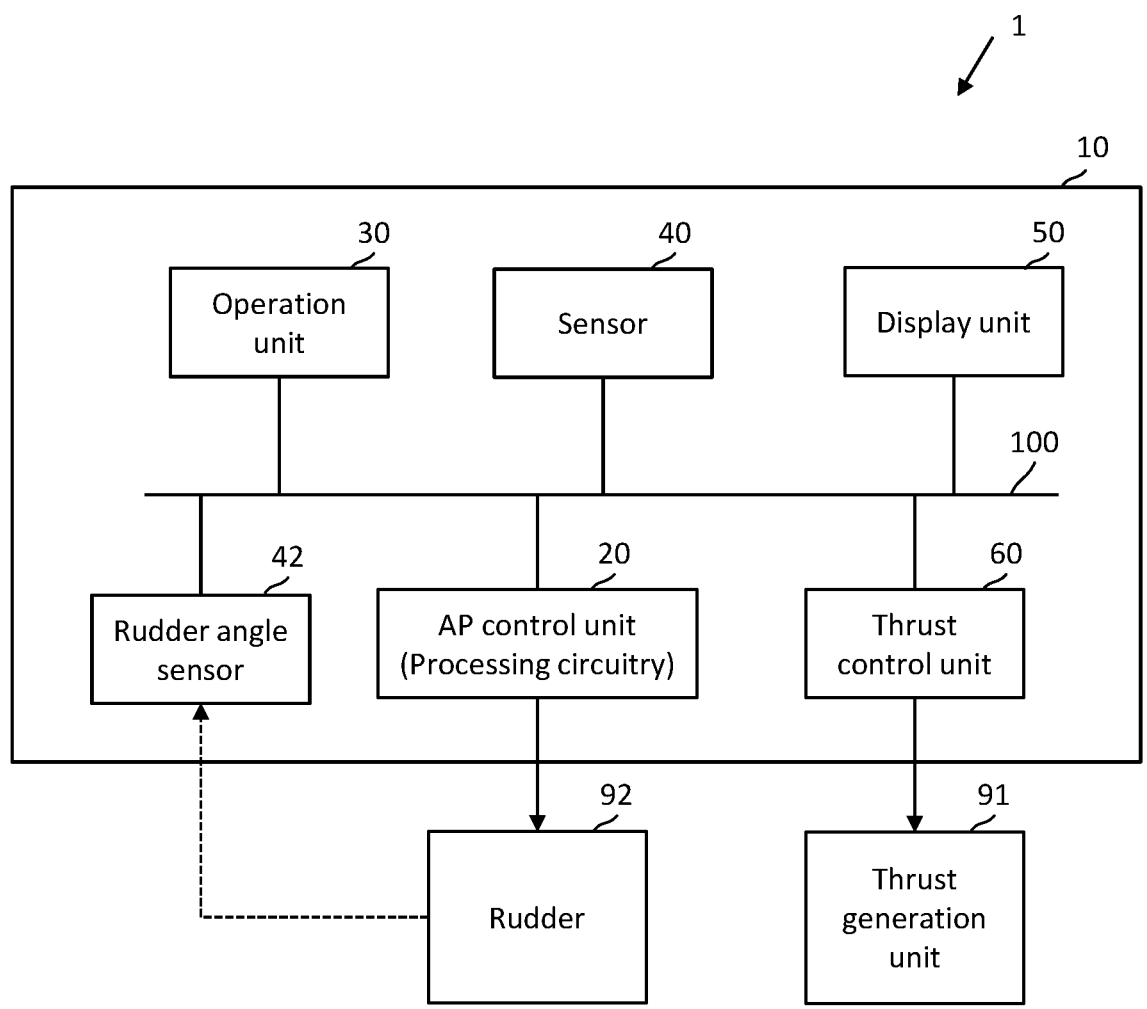
FIG. 2.
Figure 3A:
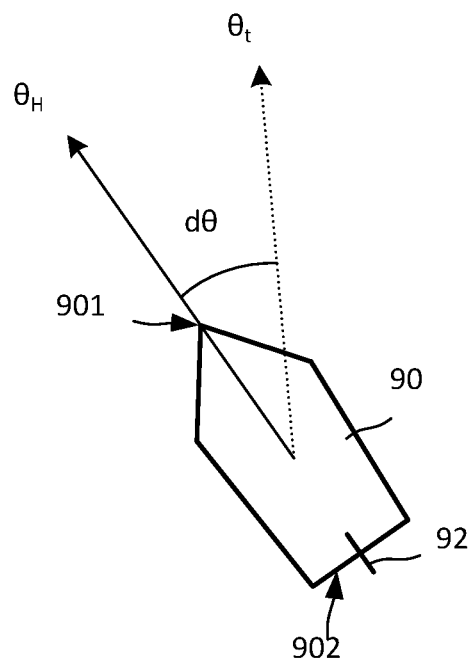
FIGS. 3A and 3B.
Figure 3B:
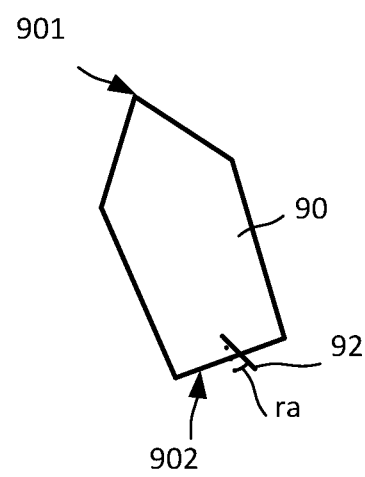

A ship control device and a ship control method according to an embodiment of the disclosure will be described with reference to the figures. FIG. 1 is a functional block diagram showing a configuration of an autopilot processor unit of a ship control device according to the embodiment of the present disclosure. FIG. 2 is a functional block diagram showing a configuration of a ship control system including the ship control device according to the embodiment of the present disclosure. FIG. 3A is a diagram showing the target and bow directions, and FIG. 3B is a diagram showing the rudder angle.

(Structure of ship control system) As shown in FIG. 2, a ship control system 1 includes a ship control device 10, a thrust generation unit 91, and a rudder 92. The ship control system 1 is provided on a ship 90 (see FIGS. 3A and 3B) for automatic navigation control (autopilot control). The thrust generation unit 91 is composed of an engine or motor and propellers or the like driven by the engine or motor. A rudder 92 is provided near a stern 902 (see FIGS. 3A and 3B) of the ship 90.

The ship control device 10 includes an autopilot processor unit 20 (In FIG. 2, it is referred to as an AP control unit 20.), an operation unit 30, a sensor 40, a rudder angle sensor 42, a display unit 50, and a thrust control unit 60. The autopilot processor unit 20, the operation unit 30, the sensor 40, the rudder angle sensor 42, the display unit 50, and the thrust control unit 60 are connected by a data communication network 100 installed in the ship 90.

The operation unit 30 is realized by, for example, a touch panel, physical buttons or switches. The operation unit 30 accepts various operations including the setting of autopilot control. The operation unit 30 outputs the operation contents to the autopilot processor unit 20.

The sensor 40 measures a ship speed v of the ship (ship) equipped with the ship control device 10 and information about the movement, altitude, and position of the ship such as the heading OH. For example, the sensor 40 is realized by a positioning sensor using the positioning signal of GNSS (For example, GPS), an inertial sensor (acceleration sensor, angular velocity sensor, etc.), a magnetic sensor, etc.

The rudder angle sensor 42 measures a rudder angle ra (see FIG. 3B) of the rudder 92. The rudder angle sensor 42 outputs the measured rudder angle ra to the autopilot processor unit 20. The rudder angle sensor 42 is realized by, for example, a sensor for mechanically measuring the rudder angle, a sensor for electrically and optically measuring the rudder angle, etc.

The display unit 50 is realized by, for example, a liquid crystal panel, etc. The display unit 50 displays information, etc., related to the autopilot control input from the autopilot processor unit 20. Although the display unit 50 can be omitted, it is preferable to have one, and by having the display unit 50, the user can easily grasp the autopilot control status, etc.

The thrust control unit 60 is connected to the thrust generation unit 91. The thrust generation unit 91 generates thrust with an output corresponding to a thrust control signal from the thrust control unit 60.

(Outline configuration and outline processing of autopilot processor unit 20) The autopilot processor unit 20 is composed of, for example, an arithmetic processing unit such as a CPU and a storage unit. The storage unit stores a program to be executed by the autopilot processor unit 20. In addition, the storage unit is utilized when computing the CPU.

The autopilot processor unit 20 (i.e., processing circuitry) executes autopilot control. The autopilot processor unit 20 also calculates control parameters for autopilot control (Proportional factor for P control $K_P$, Proportional factor for D control $K_D$) and a desired turnrate $r_{set}$. At this time, the autopilot processor unit 20 sets these control parameters (Proportional factor for P control $K_P$, Proportional factor for D control $K_D$) and a ship characteristic parameter (Turning ability index K*, time constant of steering quality T*, and dead time L) to calculate the desired turnrate $r_{set}$. Details of setting the ship characteristic parameters (Turning ability index K*, time constant of steering quality T*, and dead time L), calculation of the control parameters (Proportional factor for P control $K_P$, Proportional factor for D control $K_D$) and setting the desired turnrate $r_{set}$ will be described later.

The autopilot processor unit 20 is connected to the rudder 92. The autopilot processor unit 20 sets the command rudder angle ri by the autopilot control and outputs it to the rudder 92. The rudder 92 changes the rudder angle ra according to the command rudder angle ri.

As shown in FIG. 3A, the heading OH is the heading to which a bow 901 of the ship 90 points. The target heading $\theta_{set}$ is the heading to which the bow 901 is to be turned by autopilot control.

The autopilot processor unit 20 sequentially sets the command rudder angle ri as autopilot control so that the bow heading OH approaches the target heading $\theta_{set}$, in other words, so that a declination angle dθ, which is the difference between the target heading $\theta_{set}$ and the bow heading OH, approaches 0. At this time, the rudder angle ra measured by the rudder angle sensor 42 is fed back to the autopilot processor unit 20. Based on this rudder angle ra, the autopilot processor unit 20 performs feedback control (For example, PID control) using the above control parameters, sets the command rudder angle ri according to the desired turnrate $r_{set}$, and outputs it to the rudder 92. In the autopilot processor unit 20, the proportionality factor $K_P$ for P control and the proportionality factor $K_D$ for D control are specifically set as control parameters by a method to be described later, and the proportionality factor $K_I$ for I control is also set appropriately.

At this time, the autopilot processor unit 20 sets control parameters (Proportional factor for P control $K_P$, Proportional factor for D control $K_D$), desired turnrate $r_{set}$, and ship characteristic parameters (Turning ability index $K^*$, time constant of steering quality $T^*$, and dead time L) as described later. That is, the autopilot processor unit 20 sets the ship characteristic parameters of the combined system of first order lag and dead time, and from these ship characteristic parameters, calculates and sets the control parameters and desired turnrate.

With this, the autopilot processor unit 20 may perform appropriate feedback control according to the shape and size of the ship 90 and the rudder 92, that is, according to the behavior of the ship 90 and the behavior of the rudder 92. Therefore, the ship control device 10 may perform appropriate autopilot control according to the shape and size of the ship 90 and the rudder 92. In particular, if the ship 90 is small and the operation of the rudder 92 is not negligibly fast with respect to the operation of the ship 90, in other words, if the ship 90 is easy to operate in accordance with the operation of the rudder 92, autopilot control using the settings described below may work more effectively.

Moreover, by setting the ship characteristic parameters of the combined system of the first order lag and the dead time, it is not necessary to set the parameters complicated to set the second order lag system, etc. Therefore, it is easy to set the ship characteristic parameters.

(More specific instructions on how to set them) As shown in FIG. 1, the autopilot processor unit 20 includes a ship characteristic parameter setting unit 21, a desired turnrate calculation unit 22, a control parameter calculation unit 23, and an autopilot execution unit 24 (In FIG. 1, it is referred to as AP execution unit 24.).

The ship characteristic parameter setting unit 21 sets the ship characteristic parameters estimated by the combined system of first order lag and dead time using any of a number of setting methods. That is, the ship characteristic parameter setting unit 21 sets the turning ability index $K^*$, the time constant of steering quality $T^*$, and the dead time L. The ship characteristic parameter setting unit 21 outputs the ship characteristic parameters to the desired turnrate calculation unit 22 and the control parameter calculation unit 23.

The desired turnrate calculation unit 22 calculates a desired turnrate $r_{set}$ using a ship characteristic parameter (Turning ability index $K^*$, time constant of steering quality $T^*$, and dead time L) and a target heading $\theta_{set}$. The desired turnrate calculation unit 22 outputs the desired turnrate $r_{set}$ to the control parameter calculation unit 23 and the autopilot execution unit 24.

The control parameter calculation unit 23 calculates a control parameter (Proportional factor for P control $K_P$, Proportional factor for D control $K_D$) using a ship characteristic parameter (Turning ability index $K^*$, time constant of steering quality $T^*$, and dead time L) and the desired turnrate $r_{set}$. The control parameter calculation unit 23 outputs a control parameter (Proportional factor for P control $K_P$, Proportional factor for D control $K_D$) to an autopilot execution unit 24.

Using a control parameter (Proportional factor for P control $K_P$, Proportional factor for D control $K_D$) and the desired turnrate $r_{set}$, the autopilot execution unit 24 performs feedback control and outputs a command rudder angle ri to the rudder 92.

Figure 4:
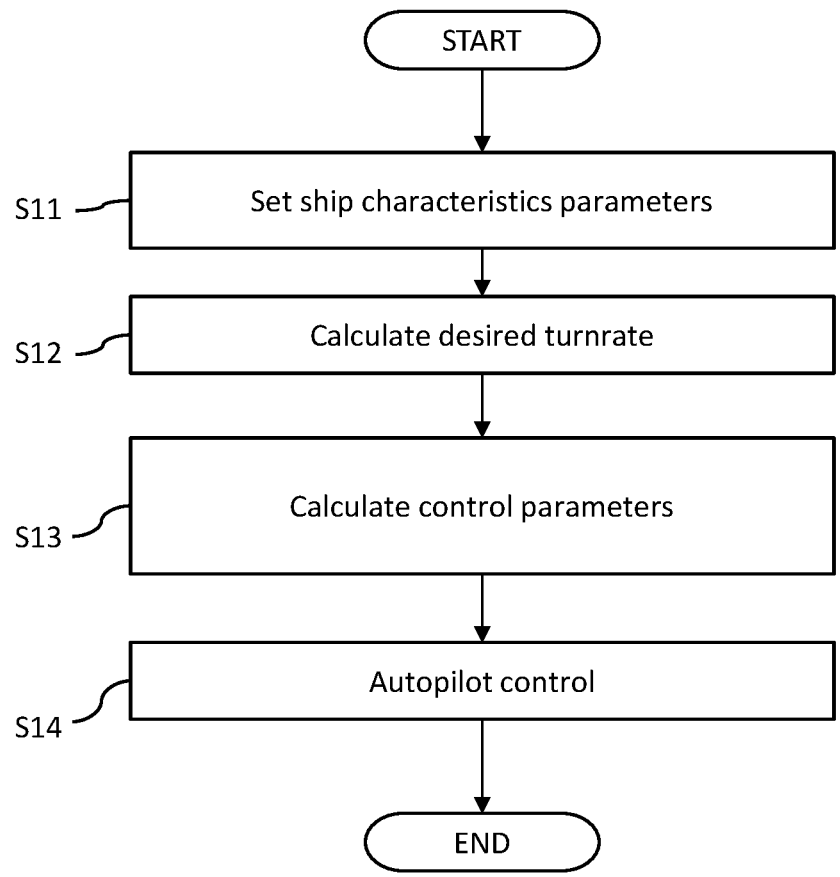
FIG. 4.

These processes may be realized by prestoring the program in a storage unit as a program or the like and then reading and executing the program by an arithmetic processing device such as a CPU. In this case, the arithmetic processing device may, for example, execute the processing of the flow chart shown in FIG. 4. FIG. 4 is a flow chart showing the schematic process from auto-tuning to autopilot control.

When the operation input of auto-tuning is received from the operation unit 30, for example, the arithmetic processing unit performs given processing and control to set ship characteristic parameters (Turning ability index $K^*$, time constant of steering quality $T^*$, and dead time L) (SM. Using the ship characteristic parameters, the arithmetic processing unit calculates a desired turnrate $r_{set}$ (S12).

Using the ship characteristic parameters and the desired turnrate $r_{set}$, the arithmetic processing unit calculates a control parameter (Proportional factor for P control $K_P$, Proportional D factor for control $K_D$) (S13). Using the control parameters and the desired turnrate $r_{set}$, the arithmetic processing unit performs autopilot control (S14).

Figure 5:
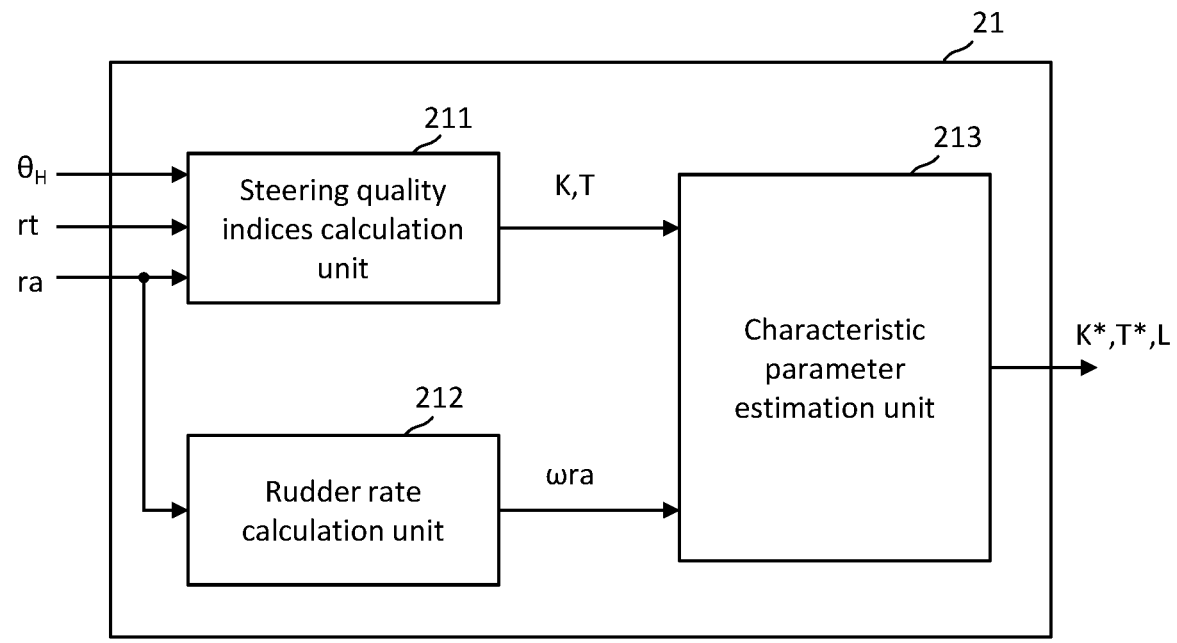
FIG. 5.
Figure 6:
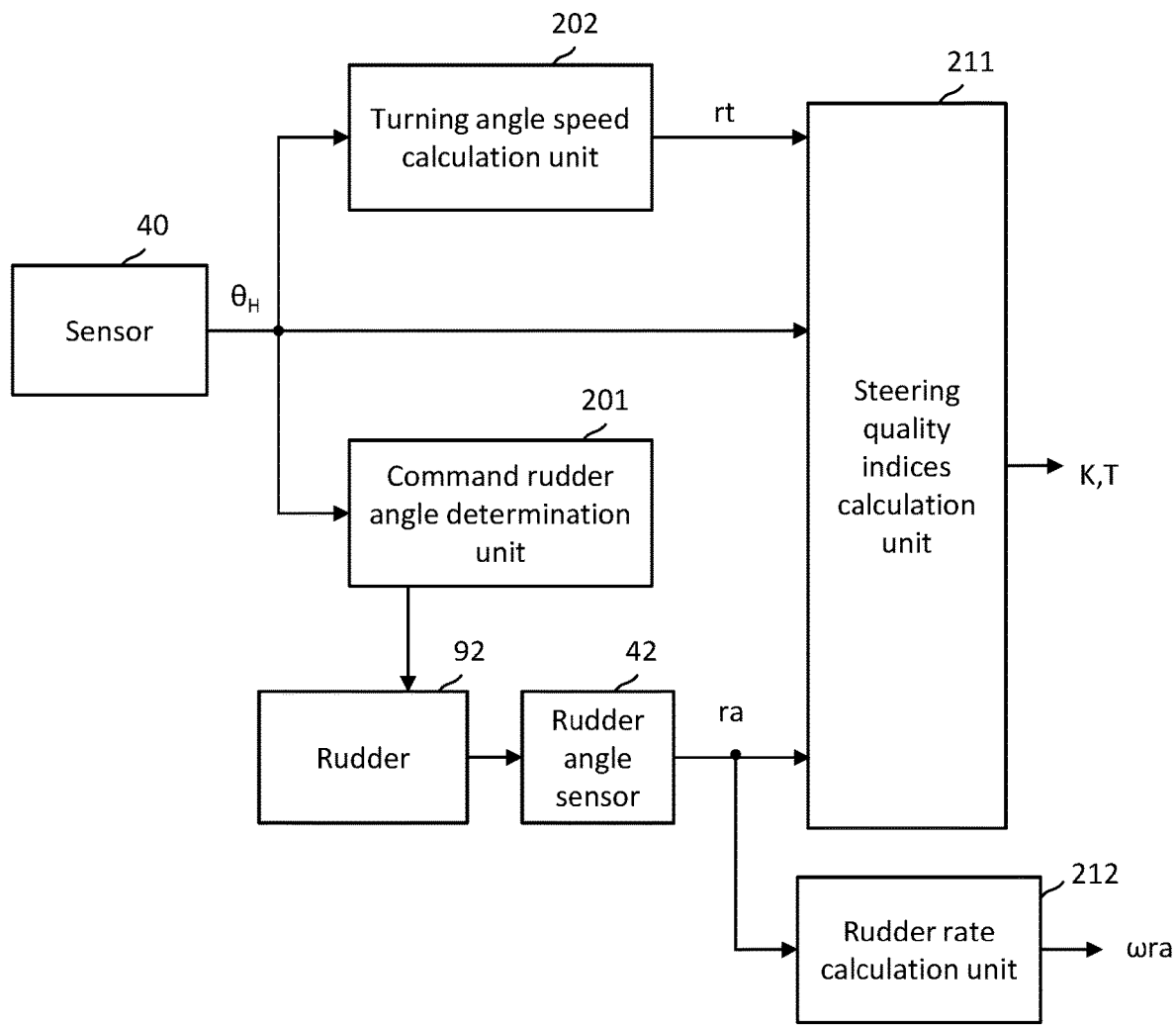
FIG. 6.

(First aspect of setting ship characteristic parameters) FIG. 5 is a functional block diagram showing the configuration of the first aspect of the ship characteristic parameter setting unit 21. FIG. 6 is a system configuration diagram of the first mode of setting ship characteristic parameters.

As shown in FIG. 5, the ship characteristic parameter setting unit 21 includes a steering quality indices calculation unit 211, a rudder rate calculation unit 212, and a characteristic parameter estimation unit 213.

A heading $\theta_H$, a turnrate rt, and a rudder angle ra are input to the steering quality indices calculation unit 211. The heading $\theta_H$, the turnrate rt, and the rudder angle ra are generated for the calculation of the steering quality indices and are obtained by, for example, a Z test (More specifically, the 5 degrees Z test).

As shown in FIG. 6, the heading $\theta_H$ is input from the sensor 40 to the steering quality indices calculation unit 211.

The turnrate rt is input from the turning angle speed calculation unit 202 to the steering quality indices calculation unit 211. The turning angle speed calculation unit 202 calculates turnrate rt from the rate of time change of the heading $\theta_H$ measured by the sensor 40. The turning angle speed calculation unit 202 is realized, for example, by an arithmetic processing unit constituting an autopilot processor unit 20 including the ship characteristic parameter setting unit 21.

The rudder angle ra is input from a rudder angle sensor 42 to the steering quality indices calculation unit 211. More specifically, the command rudder angle determination unit 201 switches the command rudder angle ri by the heading $\theta_H$ in the Z test. The command rudder angle determination unit 201 is realized by the autopilot processor unit 20. The command rudder angle determination unit 201 outputs the command rudder angle ri to the rudder 92. The rudder 92 controls the rudder angle according to the command rudder angle ri. The rudder angle sensor 42 measures the rudder angle (actual rudder angle) ra of the rudder 92 and outputs it to the steering quality indices calculation unit 211. The rudder angle sensor 42 also outputs the rudder angle ra to the rudder rate calculation unit 212.

The steering quality indices calculation unit 211 calculates the steering quality indices, i.e., the turning ability index (gain) K and the time constant of steering quality (time constant) T, using the heading $\theta_H$, the pivoting speed rt and the rudder angle ra. For example, the steering quality indices calculation unit 211 calculates the steering quality indices (Turning ability index K and time constant of steering quality T) using the known Nomoto model.

The rudder rate calculation unit 212 calculates the rudder rate w ra from the rate of time change of the rudder angle ra.

The characteristic parameter estimation unit 213 calculates the ship characteristic parameters (Turning ability index (gain) K*, time constant of steering quality (time constant) T*, and dead time L) using the steering quality indices (Turning ability index K and time constant of steering quality T) and the rudder rate w ra. At this time, the characteristic parameter estimation unit 213 calculates the ship characteristic parameters using the response simulation of the turnrate to the step-like command rudder angle.

Figure 7:
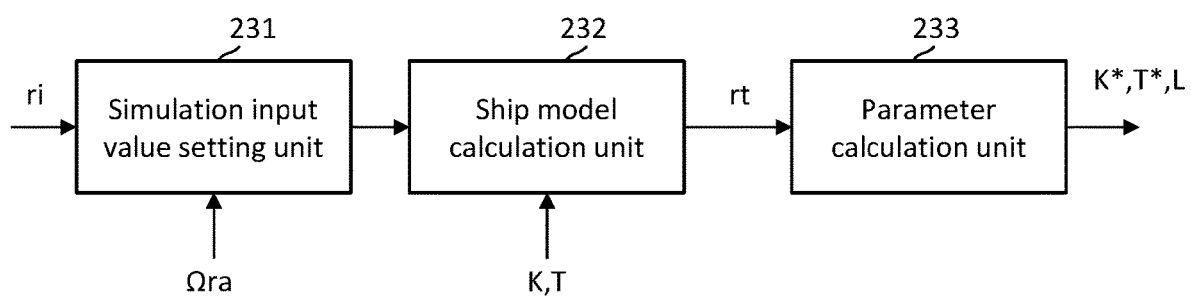
FIG. 7.
Figure 8:
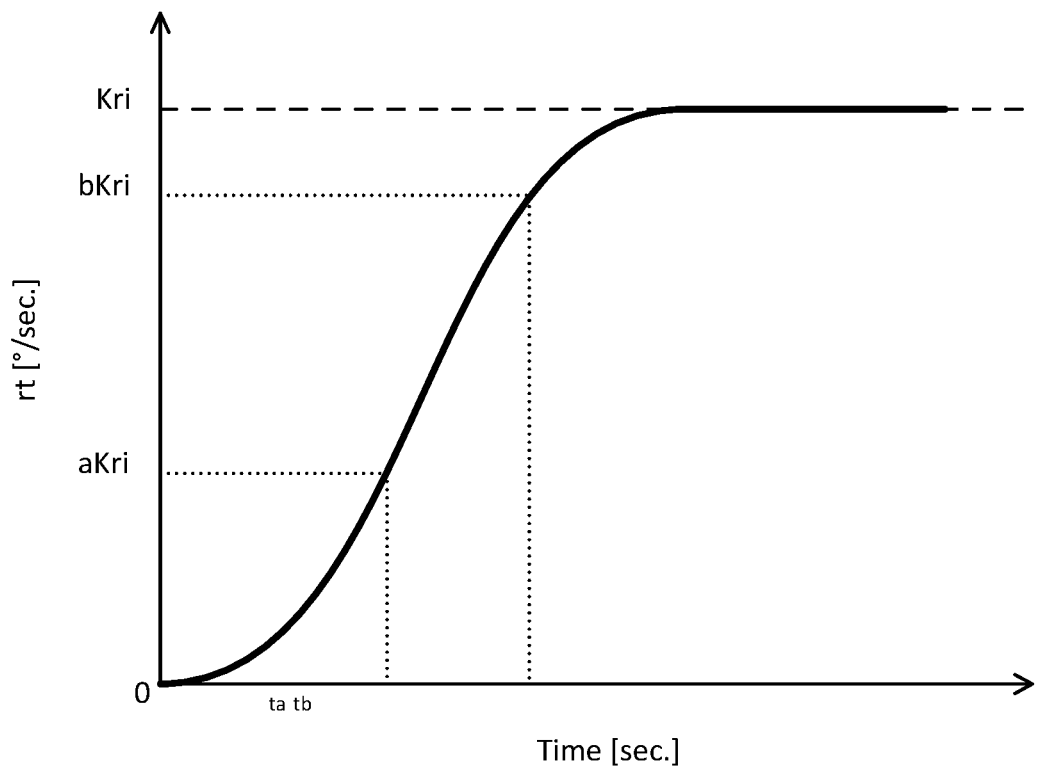
FIG. 8.

FIG. 7 is a functional block diagram showing the configuration of the characteristic parameter estimation unit. FIG. 8 is a waveform diagram showing an example of the response waveform of the turnrate for setting ship characteristic parameters.

As shown in FIG. 7, the characteristic parameter estimation unit 213 includes a simulation input value setting unit 231, a ship model calculation unit 232, and a parameter calculation unit 233.

A rudder rate w is input to the simulation input value setting unit 231. A command rudder angle ri is also input to the simulation input value setting unit 231. The simulation input value setting unit 231 sets the command rudder angle for simulation in steps so that the command rudder angle ri becomes the maximum value, and sets the simulation input value using a ramp function for the command rudder angle. At this time, the simulation input value setting unit 231 sets the slope of the ramp function according to the rudder rate w ra. The simulation input value setting unit 231 outputs the simulation input value to the ship model calculation unit 232.

The ship model calculation unit 232 applies the simulation input value and the steering quality indices (Turning ability index K and time constant of steering quality T) to the Nomoto model to simulate the turnrate rt. With this arithmetic operation, a simulation waveform is obtained as shown in FIG. 8. As shown in FIG. 8, the turnrate rt becomes a nonlinear waveform that increases with time according to the slope of the ramp function (rudder rate w ra) and the time constant of steering quality T, and plateaus at the value (Kri) of the command rudder angle ri multiplied by the turning ability index K. The ship model calculation unit 232 outputs the turnrate rt obtained in the simulation to the parameter calculation unit 233.

The parameter calculation unit 233 calculates a ship characteristic parameter (Turning ability index (gain) K*, time constant of steering quality (time constant) T*, and dead time L) using the turning ability index K of the steering quality indices and the turnrate rt obtained in the simulation.

More specifically, the parameter calculation unit 233 calculates the turning ability index K* of the ship characteristic parameter using the turning ability index K of the steering quality indices. For example, the parameter calculation unit 233 sets the turning ability index K* of the ship characteristic parameter to the same value as the turning ability index K of the steering quality indices.

The parameter calculation unit 233 calculates the time constant of steering quality T* and dead time L of the ship characteristic parameters using the time when the turnrate in the simulation waveform of the turnrate rt is a predetermined value. More specifically, the parameter calculation unit 233 detects the time ta at the first value of the turnrate rt in the simulation waveform (the value of aKri in FIG. 8). The parameter calculation unit 233 detects the time tb at the second value of the turnrate rt in the simulation waveform (the value of bKri in FIG. 8). Note that a and b are values greater than 0 and less than 1, and a is smaller than b (a<b). For example, the first value is set near the boundary where the rate of change of the slope of the waveform shifts from the interval where the rate of change of the slope of the waveform changes to the interval where the rate of change of the slope of the waveform remains constant. The second value is set near the boundary where the rate of change of the slope of the waveform shifts from the interval where the rate of change of the slope of the waveform remains constant to the interval where the rate of change of the slope of the waveform changes. The time ta and the time tb are changed by the step width of the command rudder angle.

The parameter calculation unit 233 calculates the time constant of steering quality T* of the ship characteristic parameters using the time ta and the time tb and the following equation.

$$T^* = C_1(tb - ta)$$

$C_1$ is a given constant.

The parameter calculation unit 233 calculates the time ta, the time tb and the dead time L of the ship characteristic parameters using the following equation.

$$L = C_{21}ta - C_{22}tb$$

$C_{21}$ and $C_{22}$ are given constants.

By performing such processing, the characteristic parameter estimation unit 213 can estimate and calculate the ship characteristic parameters according to the shape, size and performance of the ship 90 and the rudder 92.

Figure 9A:
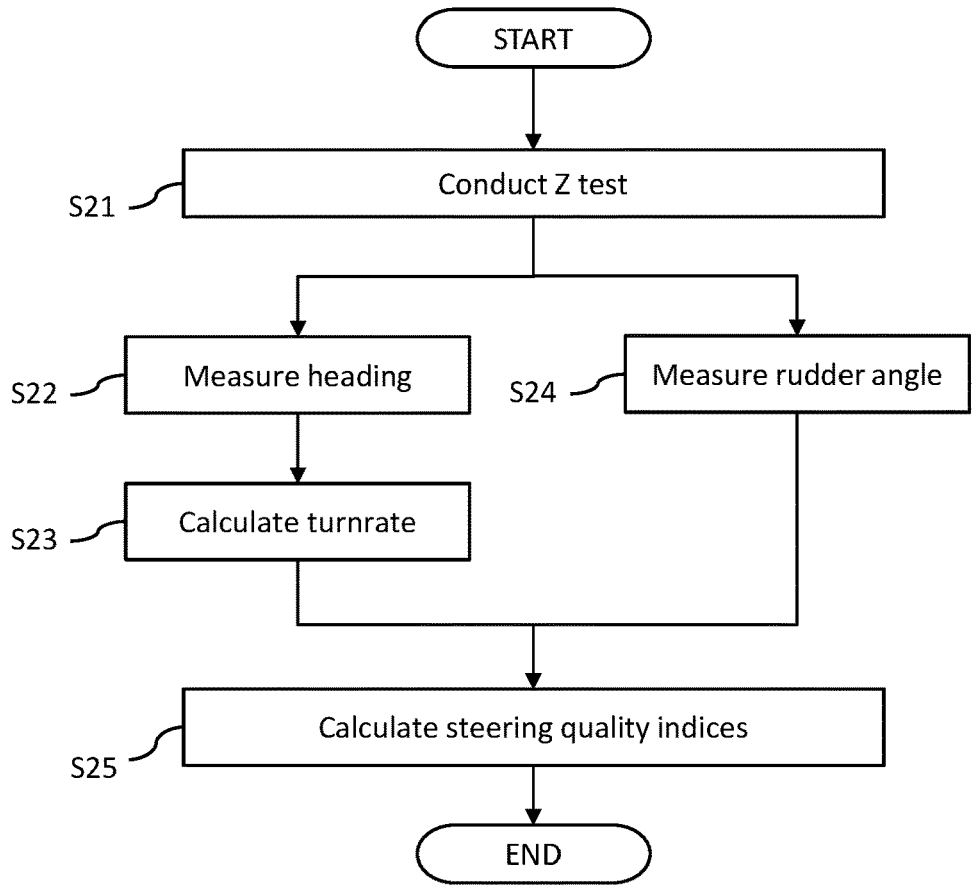
FIGS. 9A and 9B.
Figure 9B:
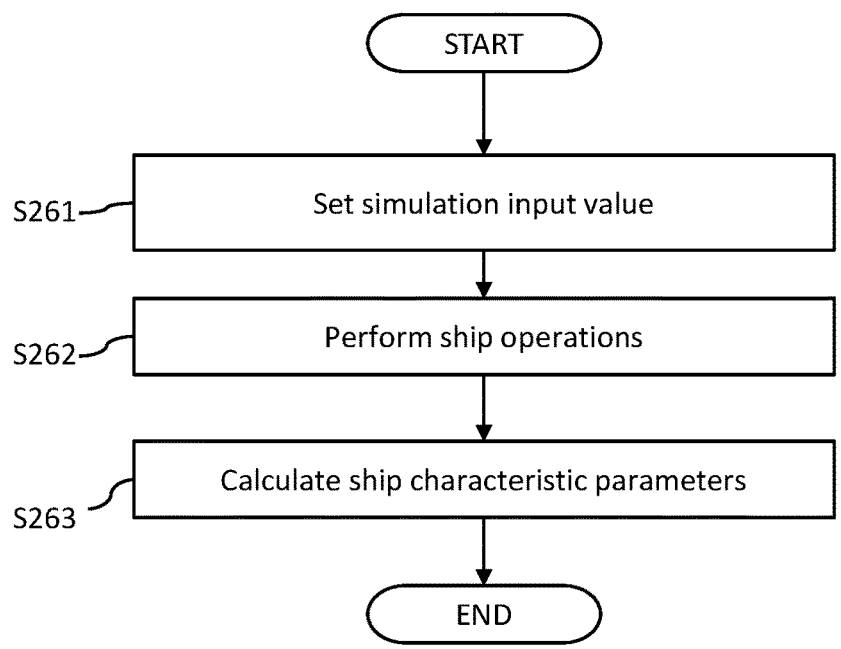

It should be noted that these processes may be realized by prestoring them in a storage unit as a program or the like and then reading and executing the program by an arithmetic processing unit such as a CPU. In this case, the arithmetic processing unit may, for example, execute the processing of the flow chart shown in FIG. 9A and FIG. 9B. FIG. 9A is a flow chart showing the schematic processing of the first calculation mode of the steering quality indices, and FIG. 9B is a flow chart showing the schematic processing of the calculation of the ship characteristic parameters.

The arithmetic processing unit controls the execution of the Z test (S21). The arithmetic processing unit measures the heading $\theta_H$ (S22) and calculates the turnrate rt (S23). The arithmetic processing unit also measures the rudder angle ra (S24).

The arithmetic processing unit calculates the steering quality indices using the heading $\theta_H$, the turnrate rt and the rudder angle ra (S25).

The arithmetic processing unit sets the simulation input value using the rudder rate ω ra and the command rudder angle ri (S261). The arithmetic processing unit performs the Ship operation using the simulation input value and the operability index (S262).

The arithmetic processing unit calculates the ship characteristic parameters from the response waveform of the turnrate, which is the simulation result (S263).

Figure 10:
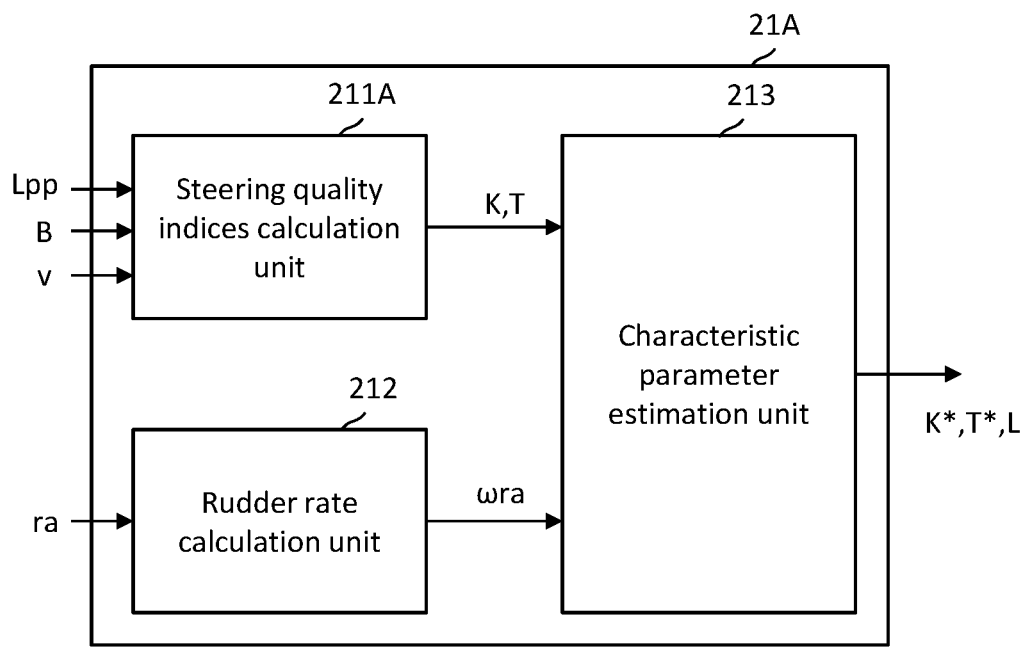
FIG. 10.
Figure 11:
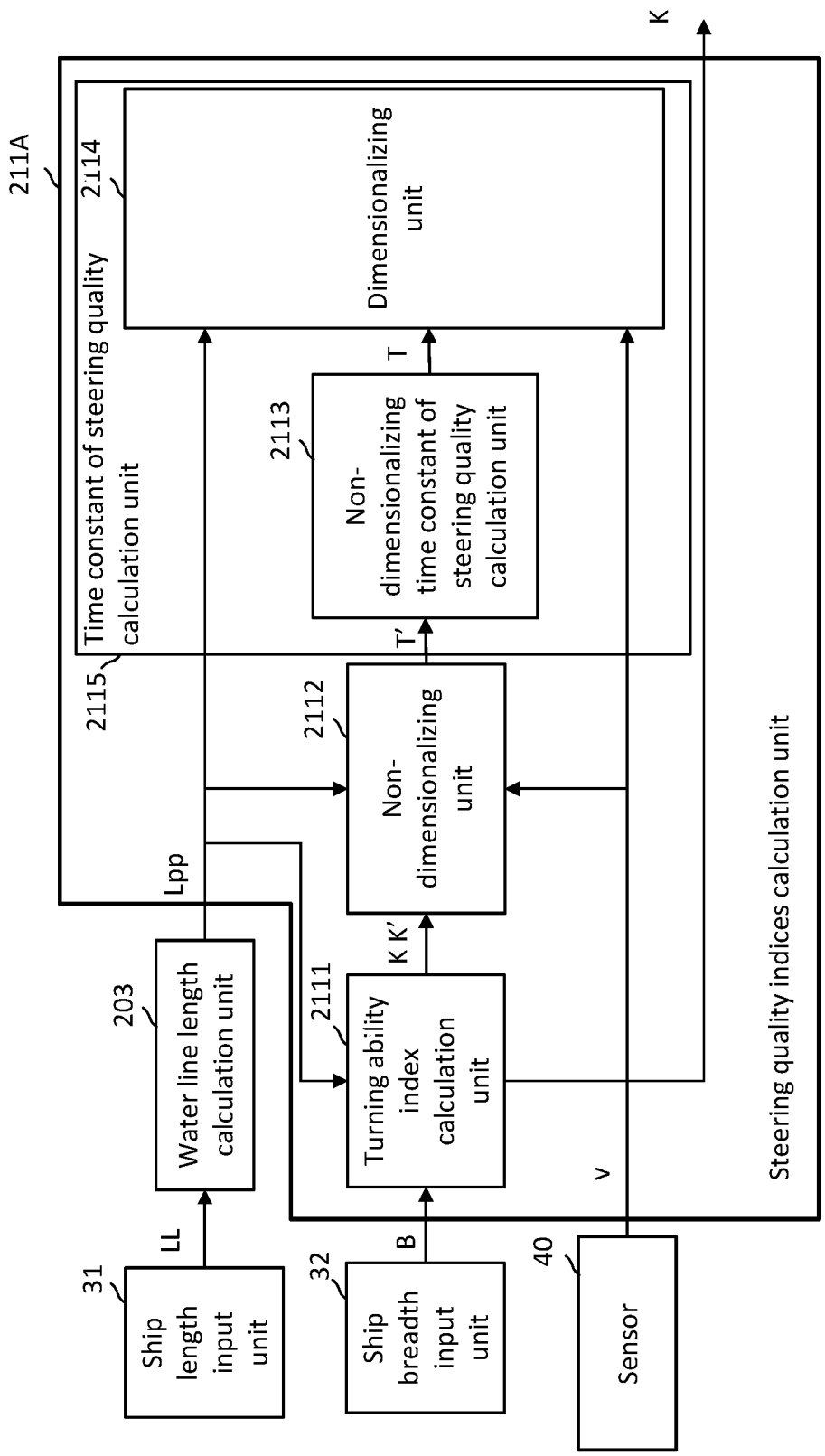
FIG. 11.

(Second aspect of setting the ship characteristic parameters) FIG. 10 is a functional block diagram showing the configuration of the second aspect of the ship characteristic parameter setting unit. FIG. 11 is a system configuration diagram of the second aspect of the ship characteristic parameter setting unit.

As shown in FIG. 10, the ship characteristic parameter setting unit 21 A includes a steering quality indices calculation unit 211 A, the rudder rate calculation unit 212, and the characteristic parameter estimation unit 213. The configuration and basic processing of the rudder rate calculation unit 212 and the characteristic parameter estimation unit 213 are the same as the configuration and basic processing of the rudder rate calculation unit 212 and the characteristic parameter estimation unit 213 in the ship characteristic parameter setting unit 21 described above, and detailed descriptions are omitted.

A length of ship between perpendiculars Lpp, a ship width B and a ship speed v are input to the steering quality indices calculation unit 211 A.

The length of ship between perpendiculars Lpp is calculated from a ship length LL. Specifically, for example, the length of ship between perpendiculars Lpp is calculated by the formula Lpp=k1L. Note that k1 is a predetermined constant smaller than 1.0 and can be set by the draft height of the ship 90. The ship length LL is, for example, input by the user or the like at the operation unit 30 (corresponding to a ship length input unit 31 in FIG. 11).

The ship width B is, for example, input by the user or the like at the operation unit 30 (corresponding to a ship width input unit 32 in FIG. 11). The ship speed v is measured and input by, for example, the sensor 40.

Using the length of ship between perpendiculars Lpp, the ship width B and the ship speed v, the steering quality indices calculation unit 211 A calculates a steering quality indices, that is, a turning ability index (gain) K and a time constant of steering quality (time constant) T.

Specifically, as shown in FIG. 11, the steering quality indices calculation unit 211 A includes a turning ability index calculation unit 2111, a non-dimensionalizing unit 2112, a time constant of steering quality calculation unit 2115. The time constant of steering quality calculation unit 2115 includs a non-dimensionalizing time constant of steering quality calculation unit 2113 and a dimensionalizing unit 2114.

The length of ship between perpendiculars Lpp and the ship width B are input to the turning ability index calculation unit 2111. The turning ability index calculation unit 2111 calculates the turning ability index K from the Length of ship between perpendiculars Lpp and ship width B using the following equation.

$$K=f_1(Lpp)/f_2(B)+C_3$$

Note that $f_1$ (Lpp) is a constant determined by the length of ship between perpendiculars Lpp, $f_2$ (B) is a constant determined by the ship width B, and $C_3$ is a desired constant. This equation was statistically derived from the experimental results of several ships with similar shapes as the ship 90.

The turning ability index K, the length of ship between perpendiculars Lpp, and the ship speed v are input to the non-dimensionalizing unit 2112. The non-dimensionalizing unit 2112 dimensionalizes the turning ability index K using the length of ship between perpendiculars Lpp and the ship speed v. The dimensionless turning ability index K' is calculated, for example, from the equation K'=(Lpp/v) K.

The dimensionless turning ability index K' is input to the non-dimensionalizing time constant of steering quality calculation unit 2113. The non-dimensionalizing time constant of steering quality calculation unit 2113 calculates the dimensionless time constant of steering quality T' from the dimensionless turning ability index K' using the following formula:

$$T'=k_2K'-C_4$$

Note that $k_2$ and $C_4$ are the desired constants. This equation was statistically derived from the experimental results of several vessels with the same shape as the ship 90.

In the dimensionalizing unit 2114, the dimensionless time constant of steering quality T', the Length of ship between perpendiculars Lpp and the ship speed v are input. The dimensionalizing unit 2114 dimensionalizes the dimensionless time constant of steering quality T 'using the Length of ship between perpendiculars Lpp and the ship speed v. The dimensionalized time constant of steering quality T is calculated, for example, from the equation T=(Lpp/v) T'.

The steering quality indices calculation unit 211 A outputs the turning ability index K output from the turning ability index calculation unit 2111 and the time constant of steering quality T output from the dimensionalizing unit 2114 to the characteristic parameter estimation unit 213.

By using such a configuration and processing, the steering quality indices calculation unit 211 A can calculate the steering quality indices according to the shape, size and performance of the ship 90 and the rudder 92, and in turn, the characteristic parameter estimation unit 213 can estimate and calculate the ship characteristic parameters according to the shape, size and performance of the ship 90 and the rudder 92.

It should be noted that the above equation for calculating the turning ability index K and the equation for calculating the dimensionless time constant of steering quality T 'are better when the coefficients for multiplying the Length of ship between perpendiculars Lpp, the ship width B and the dimensionless turning ability index K' are varied depending on the specifications of the vessel, for example, whether it is a drainage ship or a gliding ship.

Moreover, by adopting this configuration and treatment, the ship characteristic parameter setting unit 21 A can set the ship characteristic parameters without performing the Z test.

Figure 12:
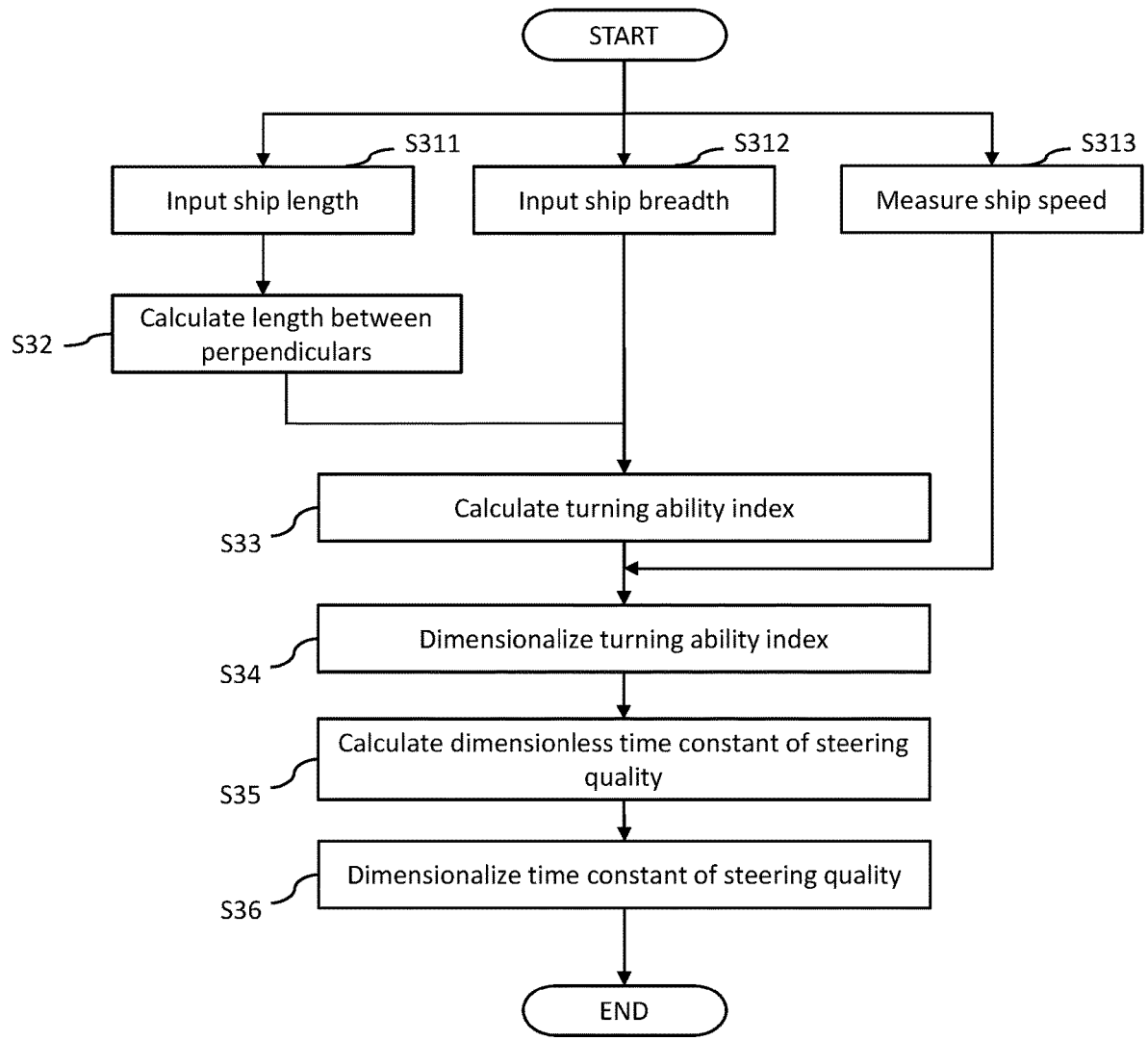
FIG. 12.

It should be noted that these treatments may be realized by prestoring the ship characteristic parameters in a storage unit as a program or the like and then reading and executing the program by an arithmetic processing device such as a CPU. In this case, the arithmetic processing device may, for example, execute the processing of the flow chart shown in FIG. 12. FIG. 12 is a flow chart showing the schematic processing of the second mode of calculation of the steering quality indices.

The arithmetic processing unit accepts input of the ship length LL (S311) and calculates the Length of ship between perpendiculars Lpp (S32). The arithmetic processing unit also accepts input of the ship width B (S312) and measures the ship speed v (S313).

The arithmetic processing unit calculates a turning ability index K from the Length of ship between perpendiculars Lpp and the ship width B (S33). The arithmetic processing unit uses the Length of ship between perpendiculars Lpp and the ship speed v to dimensionalize the turning ability index K and calculate a dimensionless turning ability index K' (S34).

The arithmetic processing unit calculates a dimensionless time constant of steering quality T' from the dimensionless turning ability index K' (S35). The arithmetic processing unit dimensionalizes the dimensionless time constant of steering quality T' and calculates the time constant of steering quality T (S36).

Figure 13:
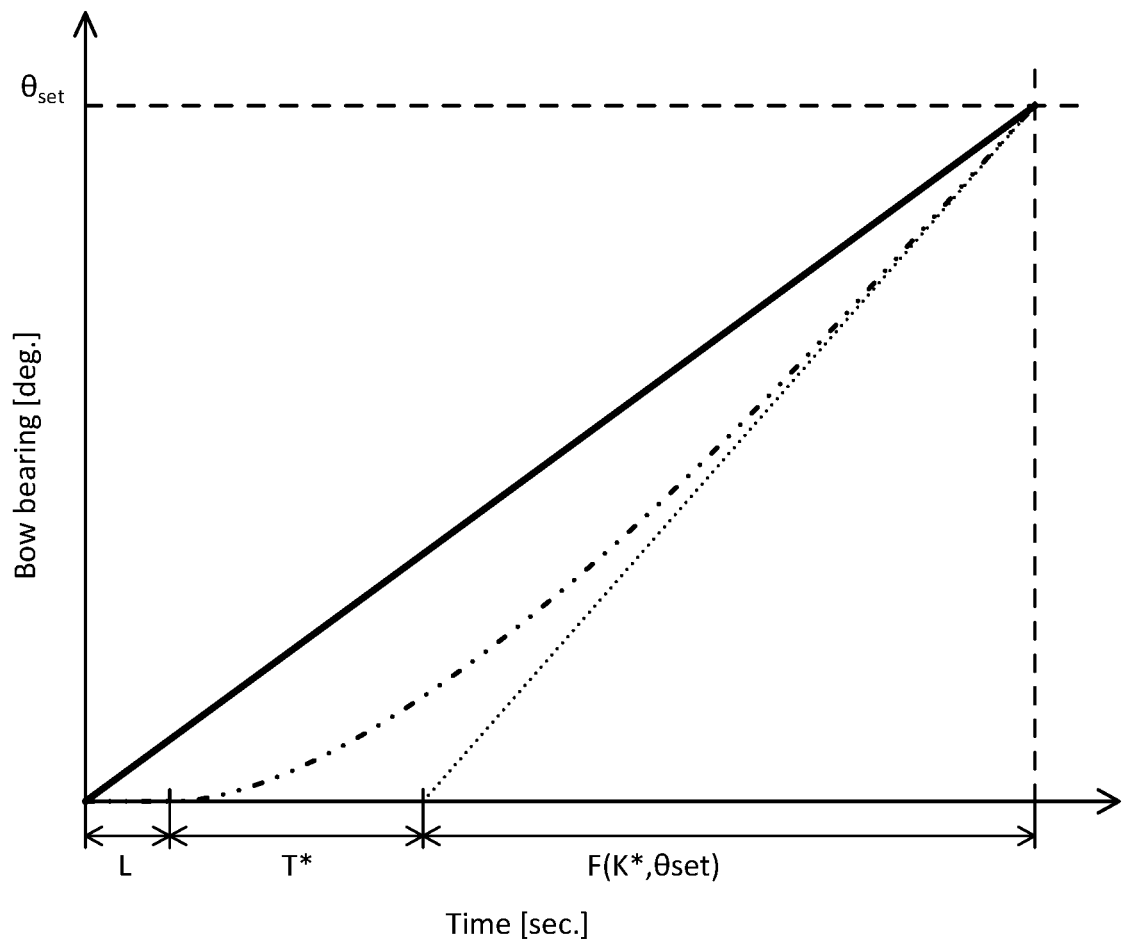
FIG. 13.

(Specific calculation method of desired turnrate $r_{set}$) FIG. 13 is a graph showing an example of the time change in heading. The dashed line in FIG. 13 shows the time change in heading when a step function of the upper limit $ra_{max}$, of the rudder angle ra is input. The solid line shows the straight line for calculating the desired turnrate $r_{set}$. Also, $\theta_{set}$ is the target heading.

As shown in FIG. 13, the heading does not change during the dead time L, gradually rises according to the time constant of steering quality (time constant) T* of the first order lag system, and changes at a rate of change according to the turning ability index K* of the first order lag system to reach the target heading $\theta_{set}$.

Then, the desired turnrate calculation unit 22 uses this characteristic to calculate the desired turnrate $r_{set}$. More specifically, the desired turnrate calculation unit 22 calculates the desired turnrate $r_{set}$ from the time difference between the control start time and the time to reach the target heading $\theta_{set}$ (determined from the ship characteristic parameters of the first order lag system) and the target heading $\theta_{set}$ using the following equation:

$$r_{set}=\theta_{set}/f_3(L,T^*,K^*,\theta_{set})$$

Note that $f_3$ (L, T*, K*, $\theta_{set}$) is a constant that defines the time difference between the control start time and the arrival time of the heading to the target $\theta_{set}$. That is, the desired turnrate calculation unit 22 sets the slope of the solid line shown in FIG. 13 to the desired turnrate $r_{set}$.

Thus, the desired turnrate calculation unit 22 can set the desired turnrate $r_{set}$ to an appropriate value according to the shape, size and performance of the ship 90.

Figure 14A:
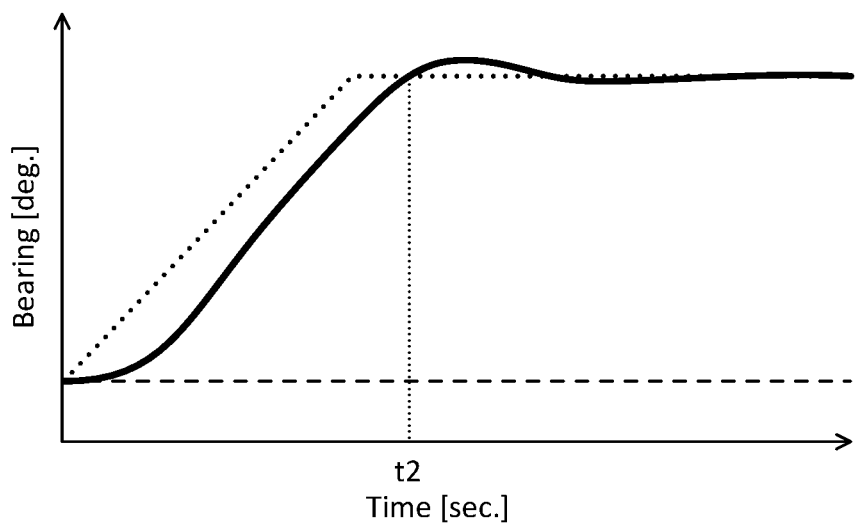
FIGS. 14A to 14C.
Figure 14B:
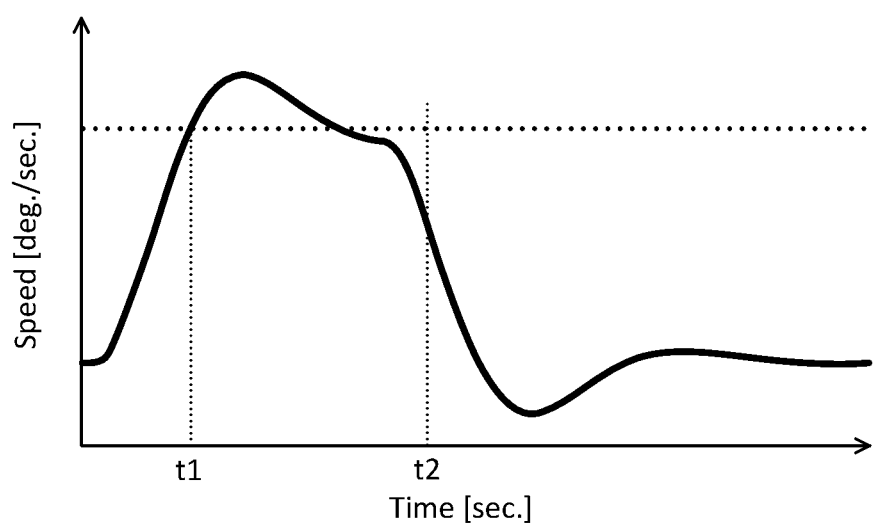
Figure 14C:
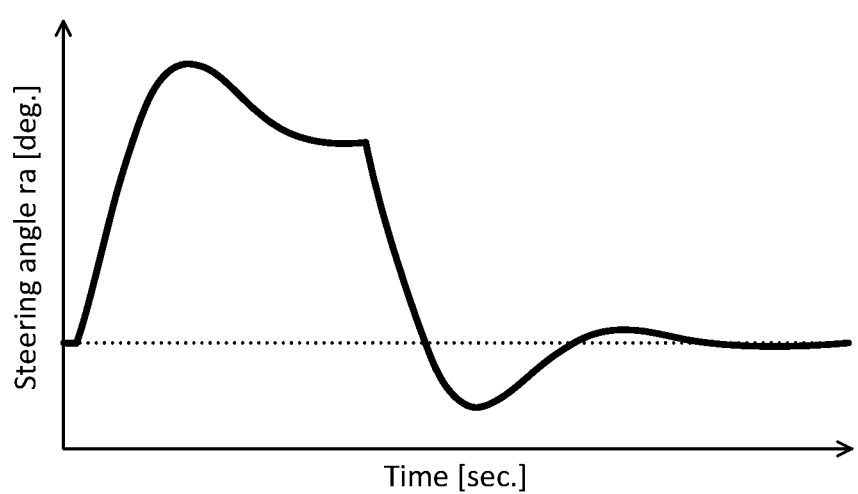

(Specific method of setting control parameters) FIG. 14A is a graph showing the time change of heading $\theta_H$ and target heading $\theta_{set}$, with the solid line indicating the heading and the dotted line indicating the target heading. FIG. 14B is a graph showing the time change of the desired turnrate $r_{set}$ and the turnrate rt, with the solid line indicating the turnrate rt and the dotted line indicating the desired turnrate $r_{set}$. FIG. 14C is a graph showing the time change of the rudder angle ra.

The control parameter calculation unit 23 sets evaluation criteria for each of heading $\theta_H$, turnrate rt, and rudder angle ra at the time of turning.

(Evaluation criteria for heading $\theta_H$ at the time of turning) The control parameter calculation unit 23 sets the evaluation criteria based on the squared error between the overshoot amount M for the target heading $\theta_{set}$ of the heading $\theta_H$ and the target value $M_{set}$. That is, the control parameter calculation unit 23 sets the evaluation criteria based on the difference between the maximum value during the period when the heading $\theta_H$ exceeds the target heading $\theta_{set}$ shown in FIG. 14A and the target value for the maximum value.

For example, the target value $M_{set}$ for the amount of overshoot can be set with the maximum amount of overshoot required to achieve the desired behavior of the ship 90.

(Evaluation criteria for turnrate rt at the time of turning) The control parameter calculation unit 23 sets an evaluation standard based on the squared error between the turnrate rt and the desired turnrate $r_{set}$. More specifically, the control parameter calculation unit 23 detects the time when the turnrate rt first reaches the desired turnrate $r_{set}$ as time t1 (see FIG. 14B). In addition, the control parameter calculation unit 23 detects the time when the heading $\theta_H$ first reaches the target azimuth $\theta_{set}$ as time t2 (see FIG. 14A).

The control parameter calculation unit 23 sets the evaluation standard based on the squared error between the turnrate rt and the desired turnrate $r_{set}$ during the time t1 to time t2. More specifically, the control parameter calculation unit 23 sets the statistical value of the squared error between the turnrate rt and the desired turnrate $r_{set}$ during the time t1 to time t2 as the evaluation standard. That is, the control parameter calculation unit 23 sets the evaluation standard based on the difference between the turnrate rt and the desired turnrate $r_{set}$ during the period between time t1 and time t2 shown in FIG. 14B.

(Evaluation standard for rudder angle ra at turning) The control parameter calculation unit 23 sets an evaluation standard based on the square value of the rudder angle ra. More specifically, the control parameter calculation unit 23 sets a statistical value of the square value of the rudder angle ra as an evaluation standard. That is, the control parameter calculation unit 23 is shown in FIG. 14C. Evaluation criteria are set based on the magnitude of the rudder angle ra with respect to the reference rudder angle (rudder angle ra=0 degrees).

By setting such evaluation criteria, the control parameter calculation unit 23 can set appropriate evaluation criteria according to the shape, size and performance of the ship 90.

The control parameter calculation unit 23 sets an evaluation function using each of the aforementioned evaluation criteria. Then, the control parameter calculation unit 23 calculates a control parameter (Proportional factor for P control $K_P$, D Proportional factor for control $K_D$) so that the evaluation function is minimized. Thus, the calculated control parameter becomes an appropriate value according to the shape, size and performance of the ship 90.

The control parameter calculation unit 23 calculates a control parameter (Proportional factor for P control $K_P$, Proportional factor for D control $K_D$) in advance for each ship characteristic parameter (Turning ability index (gain) K*, time constant of steering quality (time constant) T*, and dead time L). Then, the control parameter calculation unit 23 stores each combination in a database.

Upon receiving the ship characteristic parameters (Turning ability index (gain) K*, time constant of steering quality (time constant) T*, and dead time L), the control parameter calculation unit 23 searches the database, reads the control parameters (Proportional factor for P control $K_P$, Proportional factor for D control $K_D$) corresponding to the received ship control parameters from the database, and outputs them.

Figure 15:
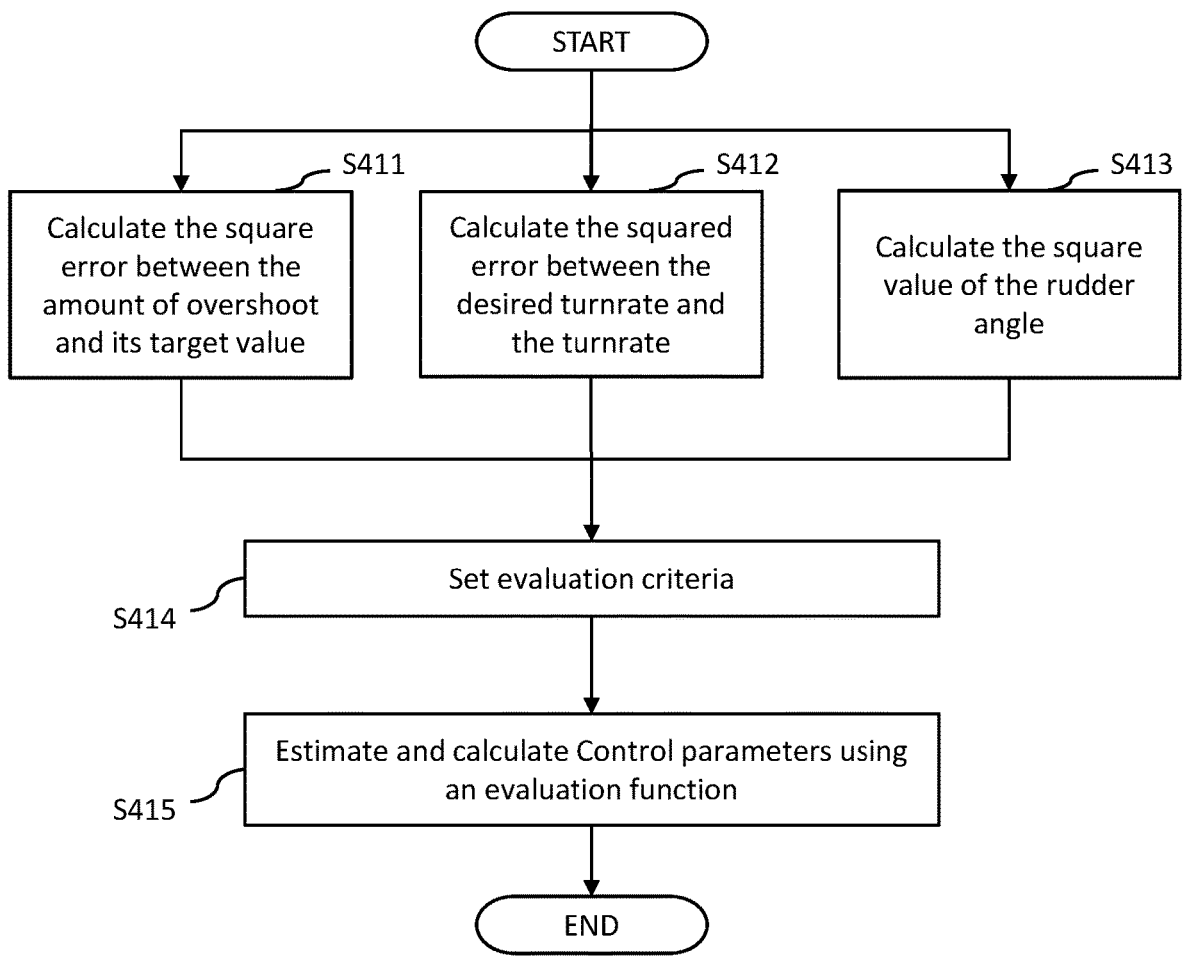
FIG. 15.

These processes may be realized by prestoring them in a storage unit as a program or the like, and then reading and executing the program by an arithmetic processing device such as a CPU. In this case, the arithmetic processing device may, for example, execute the processing of the flow chart shown in FIG. 15. FIG. 15 is a flow chart showing the schematic processing of the calculation of control parameters.

The arithmetic processing unit calculates the overshoot amount M of the bow $\theta_H$ with respect to the target $\theta_{set}$, and calculates the squared error between the overshoot amount M and its target value $M_{set}$ (S411). The arithmetic processing unit calculates the squared error between the desired turnrate $r_{set}$ and the turnrate rt (S412). The arithmetic processing unit calculates the squared value of the rudder angle ra (S413). The arithmetic processing unit sets an evaluation criterion based on each of the calculated values described above and sets an evaluation function based on the evaluation criterion (S414). The arithmetic processing unit estimates and calculates control parameters using the evaluation function (S415).

In the above explanation, the mode in which the control parameters and the desired turnrate $r_{set}$ are set from the ship characteristic parameters set by the coupled system of the first order lag and dead time is shown. However, the desired turnrate $r_{set}$ may be a predetermined value.

In the above explanation, three kinds of evaluation criteria for the evaluation function are used. However, the evaluation function may be set using at least one of the three types described above.

It is to be understood that not necessarily all objectives or advantages may be achieved in accordance with any particular embodiment described herein. Thus, for example, those skilled in the art will appreciate that certain embodiments may be configured to operate in a manner that achieves or optimizes one advantage or group of advantages as taught herein without necessarily achieving other objects or advantages as may be taught or suggested herein.

All processes described herein may be embodied in, and fully automated via, software code modules executed by a computing system that includes one or more computers or processors. The software code modules may be stored in any type of non-transitory computer-readable medium or other computer storage device. Some or all methods may be embodied in specialized computer hard ware.

Many other variations other than those described herein will be apparent from this disclosure. For example, depending on the embodiment, certain actions, events, or functions of any of the algorithms described herein may be performed in different sequences, and may be added, merged, or excluded altogether (e.g., not all described actions or events are required to execute the algorithm). Moreover, in certain embodiments, operations or events are performed in parallel, for example, through multithreading, interrupt handling, or through multiple processors or processor cores, or on other parallel architectures, rather than sequentially. In addition, different tasks or processes can be performed by different machines and/or computing systems that can work together.

The various exemplary logical blocks and modules described in connection with the embodiments disclosed herein can be implemented or executed by a machine such as a processor. The processor may be a microprocessor, but alternatively, the processor may be a controller, a microcontroller, or a state machine, or a combination thereof. The processor can include an electrical circuit configured to process computer executable instructions. In another embodiment, the processor includes an application specific integrated circuit (ASIC), a field programmable gate array (FPGA), or other programmable device that performs logical operations without processing computer executable instructions. The processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, the processor may also include primarily analog components. For example, some or all of the signal processing algorithms described herein may be implemented by analog circuitry or mixed analog and digital circuitry. A computing environment may include any type of computer system, including, but not limited to, a computer system that is based on a microprocessor, mainframe computer, a digital signal processor, a portable computing device, a device controller, or a computing engine within the device.

Unless otherwise stated, conditional languages such as "can," "could," "will," "might," or "may" are understood within the context as used in general to convey that certain embodiments include, while other embodiments do not include, certain features, elements and/or steps. Thus, such conditional languages are not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive languages, such as the phrase "at least one of Y, or Z," unless specifically stated otherwise, is understood with the context as used in general to present that an item, term, etc., may be either X, Y, or Z, or any combination thereof (e.g., X, Y, and/or Z). Thus, such a disjunctive language is not generally intended to, and should not, imply that certain embodiments require at least one of X, at least one of Y, or at least one of Z to each be present.

Any process descriptions, elements, or blocks in the flow diagrams described herein and/or shown in the accompanying drawings should be understood as potentially representing modules, segments, or parts of code, including one or more executable instructions for implementing a particular logical function or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under" are defined with respect to the horizontal plane.

As used herein, the terms "attached," "connected," "coupled," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A ship control device, comprising:
processing circuitry configured to:
set ship characteristic parameters of a combined system of first-order lag and dead time, which integrates a behavior of a rudder and a behavior of a ship;
calculate control parameters for feedback control with respect to a rudder angle of the rudder using the ship characteristic parameters;
perform the feedback control using the control parameters;
calculate a desired turnrate of a command rudder angle with respect to the rudder angle using the ship characteristic parameters;
perform the feedback control using the desired turnrate;
calculate the control parameters using an evaluation function including the rudder angle, a turnrate, and a heading as evaluation criteria; and
calculate the control parameters by including a squared error between an amount of overshoot of the heading with respect to the target heading and the target heading in the evaluation criteria.

2. The ship control device of claim 1, wherein the processing circuitry is further configured to:
calculate the desired turnrate using the ship characteristic parameters and a target heading.

3. The ship control device of claim 1, wherein the processing circuitry is further configured to:
calculate the control parameters by including a squared error between the desired turnrate and the turnrate in the evaluation criteria.

4. The ship control device of claim 1, wherein the processing circuitry is further configured to:
calculate the control parameters by including a squared value of the rudder angle in the evaluation criteria.

5. The ship control device of claim 1, wherein the processing circuitry is further configured to:
calculate steering quality indices using the heading, the turnrate and the rudder angle;
calculate a rudder speed using the rudder rate; and
calculate the ship characteristic parameters using the steering quality indices and the rudder rate.

6. The ship control device of claim 5, wherein the processing circuitry is further configured to:
calculate the ship characteristic parameters using a time-varying characteristic of the turnrate calculated from the rudder rate and the steering quality indices.

7. The ship control device of claim 6, wherein the processing circuitry is further configured to:
calculate the ship characteristic parameters using timings having different predetermined values for the turnrate in the time-varying characteristic.

8. The ship control device of claim 7, wherein the processing circuitry is further configured to:
calculate dead time or a time constant of steering quality in the ship characteristic parameters using the time-varying characteristic.

9. The ship control device of claim 1, wherein the processing circuitry is further configured to:
calculate steering quality indices using a length of ship between perpendiculars relative to the ship, a ship breadth of the ship, and a ship speed of the ship;
calculate a rudder speed using the rudder rate; and
calculate the ship characteristic parameters using the steering quality indices and the rudder rate.

10. The ship control device of claim 9, wherein the processing circuitry is further configured to:
calculate a turning ability index in the steering quality indices using the length of ship between perpendiculars and the ship breadth, and
calculate a time constant of steering quality in the steering quality indices using the turning ability index, the length of ship between perpendiculars, and the ship speed.

11. The ship control device of claim 10, wherein the processing circuitry is further configured to:
non-dimensionalize the turning ability index;
calculate a non-dimensionalizing time constant of steering quality from the non-dimensionalized turning ability index; and
dimensionalize the non-dimensionalizing time constant of steering quality.

12. The ship control device of claim 2, wherein the processing circuitry is further configured to:
calculate steering quality indices using the heading, the turnrate and the rudder angle;
calculate a rudder speed using the rudder rate; and
calculate the ship characteristic parameters using the steering quality indices and the rudder rate.

13. The ship control device of claim 2, wherein the processing circuitry is further configured to:
calculate steering quality indices using a length of ship between perpendiculars relative to the ship, a ship breadth of the ship, and a ship speed of the ship;
calculate a rudder speed using the rudder rate; and calculate the ship characteristic parameters using the steering quality indices and the rudder rate.

14. The ship control device of claim 13, wherein the processing circuitry is further configured to:
   calculate a turning ability index in the steering quality indices using the length of ship between perpendiculars and the ship breadth, and
   calculate a time constant of steering quality in the steering quality indices using the turning ability index, the length of ship between perpendiculars, and the ship speed.

15. A ship control method, comprising:
   setting ship characteristic parameters of a combined system of first-order lag and dead time, which integrates a behavior of a rudder and a behavior of a ship;
   calculating control parameters for feedback control with respect to a rudder angle of the rudder using the ship characteristic parameters;
   performing the feedback control using the control parameters;
   calculating a desired turnrate of a command rudder angle with respect to the rudder angle using the ship characteristic parameters;
   performing the feedback control using the desired turnrate;
   calculating the control parameters using an evaluation function including the rudder angle, a turnrate, and a heading as evaluation criteria; and
   calculating the control parameters by including a squared error between an amount of overshoot of the heading with respect to the target heading and the target heading in the evaluation criteria.

* * * * *